Oct. 11, 1932.    K. E. LYMAN    1,881,769
OIL COOLING MEANS
Filed Dec. 22, 1930
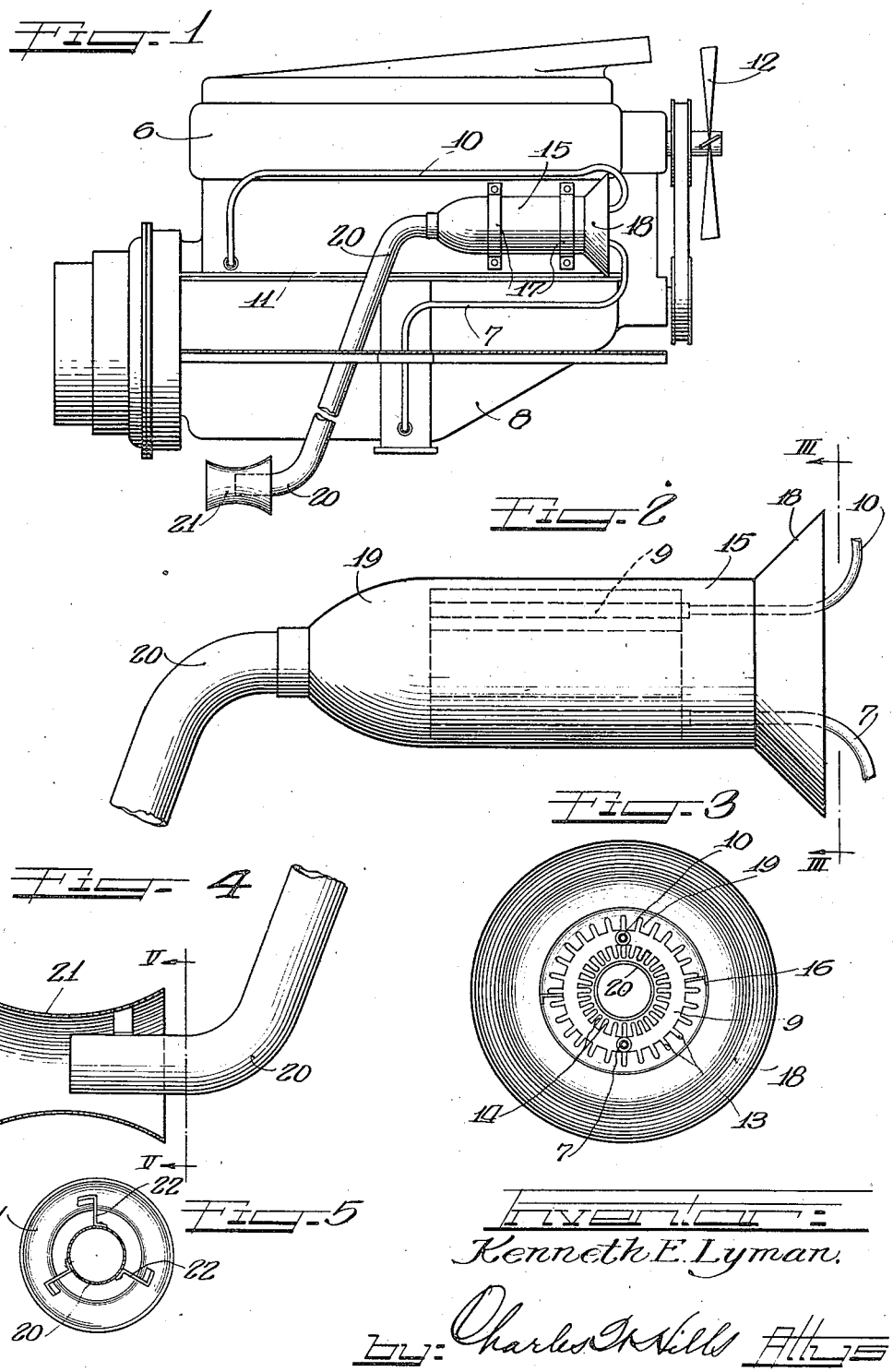
Inventor:
Kenneth E. Lyman.
By: Charles T. Wills Attys Patented Oct. 11, 1932

1,881,769

UNITED STATES PATENT OFFICE

KENNETH E. LYMAN, OF CHICAGO, ILLINOIS, ASSIGNOR TO BORG-WARNER CORPORATION, OF CHICAGO, ILLINOIS, A CORPORATION OF ILLINOIS

OIL COOLING MEANS

Application filed December 22, 1930. Serial No. 504,053.

This invention relates to improvements in oil cooling means, and more particularly to improved means for creating or inducing a pronounced draft immediately adjacent or around a cooler having a heat dissipating surface, although the invention may have many and various uses and purposes as will be apparent to one skilled in the art.

Heretofore, many oil cooling or combined oil cooling and filtering devices have been developed for connection in the lubricant line of internal combustion engines and various other mechanisms where a constant supply of lubricant is deemed essential. In many instances, these cooling devices were provided with heat dissipating surfaces so that air current surrounding the cooling device would aid the device in dissipating heat. However, it is desirable to increase the efficiency of these devices, especially when the devices are associated with a vehicle or other internal combustion engine mounted under a hood. While the cooler mounted in a vehicle may be sufficiently efficient while the vehicle is in motion, with the radiator shutters closed or when the engine is running at idle speed, or due to other circumstances, air circulation beneath the hood may be reduced to a minimum and consequently, the efficiency of the lubricant cooler is also reduced to some extent. Therefore, it is desirable to create or induce a pronounced and positive draft over the surfaces of the lubricant cooler under any and all conditions and thus markedly increase the efficiency of the oil cooler under any and all conditions of engine operations so that the oil cooler will not only efficiently and expeditiously cool the engine lubricant, but in so doing, in many instances, will actually aid in keeping the engine temperature down to a desired operating point. With the efficiency of the cooler thus increased, even though a vehicle equipped with such a cooler be driven with the hood substantially sealed and shutters closed, the cooler will nevertheless operate at an efficiency not heretofore attainable in devices of this character.

With the foregoing in mind, it is an object of the present invention to provide means for creating a positive draft over the heat dissipating surfaces of a fluid cooling device.

It is also an object of this invention to provide means for association with the lubricant cooler in a vehicle engine so constructed and disposed as to cause draft due to the travel of the vehicle to induce a positive draft of air over the lubricant cooler.

A further object of this invention is the provision of means disposable around the cooler on an automotive engine, a portion of the means being located beneath the engine, and the means so constructed that road draft will aspirate air through the means and over the surface of the cooler.

A still further object of this invention is the provision of Venturi means for inducing a positive draft over the surfaces of a lubricant cooling device.

It is still another object of this invention to provide means for enhancing the efficiency of the lubricant cooler of an automotive engine, which means and cooler may be mounted in any desired position on the engine regardless of the direction of travel of the vehicle carrying the engine, and the means will greatly increase the efficiency of the cooler.

While some of the more salient features, characteristics and advantages of means embodying the present invention have been above pointed out, others will become apparent from the following disclosures.

The invention includes these and other features of construction and combinations of parts hereinafter described, and shown in a preferred form on the drawing, as more particularly indicated by the claims.

On the drawing:

Figure 1 is a view in elevation of an internal combustion engine equipped with an oil cooler and means embodying the present invention.

Figure 2 is an enlarged fragmentary elevational view of a portion of the structure shown in Figure 1.

Figure 3 is a vertical sectional view taken substantially as indicated by the line III—III of Figure 2.

Figure 4 is an enlarged part sectional, part elevational view, of a portion of the structure shown in the lower left-hand part of Figure 1.

Figure 5 is a vertical sectional view taken substantially as indicated by the line V—V of Figure 4.

As shown on the drawing:

In the illustrated embodiment of the present invention, there is shown an automotive internal combustion engine 6 having a lubricant conduit 7 leading from the lower portion of the crank case 8 to the intake port of an oil cooler 9, and a lubricant conduit 10 leading from the outlet port of the cooler 9 into the cylinder block 11.

The oil cooler 9 may be mounted in any desired or suitable location relative to the engine, but is preferably mounted adjacent the forward end of the engine so that the cooler will be in the path of an air current created by the engine fan 12. The oil cooler 9 shown in the present instance may be of any desired character, but it is found highly expedient to use a combined cooler and filter of the character disclosed and described in my copending application for United States Letters Patent, entitled "Oil cooler and filter," Serial No. 481,394, filed September 12, 1930. As set forth more fully in the aforesaid copending application, the cooler 9 is not only cylindrical, but also toroidal in shape and provided on the exterior cylindrical surface thereof with a plurality of spaced fins or vanes 13 extending substantially radially outwardly and longitudinally substantially the full length of the cooler shell. The cylinder is also provided with a plurality of similar fins 14 extending inwardly in the central passage through the cooler shell.

To enhance the efficiency of the oil cooler, there is, in this instance, a tubular casing or member 15 disposed around the oil cooler 9 in spaced relationship thereto, this relationship being maintained with the aid of suitable lugs 16 brazed or otherwise secured to one of the fins 13 on the cooler, and welded or otherwise secured to the internal surface of the member 15. The structure is held in position with relation to the engine 6 by means of a pair of straps 17 bolted or otherwise secured to the cylinder block or any other desired part of the engine.

It will be noted that the tubular member 15 extends beyond the oil cooler 9 at each end thereof, and at the forward end of the said member 15 is provided with a bell 18 for directing a larger than normal quantity of air into and through the casing. Adjacent the rear end thereof the tubular casing is arced inwardly as at 19 (Figure 2) in order to reduce the diameter of the casing at this point sufficient to establish the proper connection with a pipe or air conduit 20, and afford no abrupt turns or obstructions to the passage of air through the casing.

The air pipe of conduit 20 is of any desired length and extends to any desired location, preferably a region of natural draft, and, in the event the engine 6 is used in automobile or similar vehicle, the pipe 20 preferably extends beneath the engine side pans so as to be in the region of road draft. The free end of the conduit 20 is preferably disposed oppositely to the direction of travel of the vehicle carrying the engine. Around this free end a Venturi tube 21 is mounted in spaced relationship to the end of the conduit 20 and held in this position by means of suitable Z-brackets 22 the angles of which are secured in any desired manner to the conduit and inner surface of the Venturi tube. As seen more clearly in Figures 4 and 5, the conduit 20 extends to substantially the central region of the Venturi tube, or portions of smallest size, and the forward end of the Venturi tube is preferably belled to a slightly greater extent than the rear end thereof.

In operation, the present invention is extremely simple, efficient and positive. For example, assuming the engine 6 to be mounted in an automotive vehicle, as the vehicle travels the Venturi tube 21 will be directly in the path of the road draft and the air passing through this tube will aspirate air through the tubular casing 15 and conduit 20, thereby passing the air over the fins 13 and 14 and exposed surfaces of the oil cooler 9, greatly enhancing the efficiency of the cooler. In the event the cooler is shielded as by a hood and shutters closed, the Venturi tube 21 due to its exposed condition will still induce a draft through the casing 15 and conduit 20 over the oil cooler. The inducement of the draft, of course, is encouraged by the bell 18 on the front end of the casing 15. It will also be noted when the bell 18 is disposed in the path of the draft created by the fan 12, the passage of air through the casing and over the cooler will be further augmented.

From the foregoing, it will be apparent that I have provided means for cooling oil which enhance the efficiency of oil coolers to a considerable extent and insure a positive draft of air over the the cooler regardless of atmospheric conditions in the immediate vicinity of the cooler. Moreover, in the event the present invention is used in connection with the engine in a vehicle, the road draft is employed to aspirate air through the inventive structure. In addition, the present invention may be readily and easily mounted in connection with any cooler now in service or just as easily installed together with the cooler, is light in weight, efficient in action, durable, requires no repairs, and may be economically manufactured.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In combination, an oil cooler having external heat dissipating fins thereon, tubular means disposed around said cooler, and means connected to said tubular means adjacent an end thereof for aspirating air therethrough and between said fins.

2. In combination, a fluid container having a heat dissipating surface, a tubular element around said container in spaced relationship thereto and extending at each end therebeyond, a bell on the forward end of said element, a pipe leading from the rear end of said element, and a Venturi tube associated with another portion of said pipe for aspirating air through said element.

3. Means for cooling the lubricant of a vehicle engine having a lubricant line, said means comprising a lubricant cooler connected in the line, a tubular casing around said cooler in spaced relationship thereto, a pipe connected to and leading from an end of said casing extending below the engine into the path of road draft, and means responsive to road draft cooperable with said pipe to aspirate air through said pipe and said casing.

In testimony whereof I have hereunto subscribed my name at Chicago, Cook County, Illinois.

KENNETH E. LYMAN.